United States Patent [19]

Andersson

[11] 4,262,535

[45] Apr. 21, 1981

[54] APPARATUS FOR METERING OR DISTRIBUTING THE VOLUME OF LIQUIDS

[75] Inventor: Jan Andersson, Söderköping, Sweden

[73] Assignee: AB Industrifirman Skandia, Anderstorp, Sweden

[21] Appl. No.: 21,610

[22] PCT Filed: Feb. 13, 1979

[86] PCT No.: PCT/SE78/00011

§ 371 Date: Feb. 28, 1979

§ 102(e) Date: Feb. 13, 1979

[87] PCT Pub. No.: WO79/00019

PCT Pub. Date: Jan. 11, 1979

[22] Filed: Feb. 13, 1979

[51] Int. Cl.³ ............................................. G01F 23/02
[52] U.S. Cl. ........................................ 73/428; 73/323
[58] Field of Search ................ 73/426, 427, 428, 323; 222/158

[56] References Cited

U.S. PATENT DOCUMENTS

| | | | |
|---|---|---|---|
| 3,699,815 | 10/1972 | Kolbrook | 73/427 |
| 4,094,648 | 6/1978 | Seeley | 73/426 |

FOREIGN PATENT DOCUMENTS 130435 3/1901 Fed. Rep. of Germany ............. 73/427

Primary Examiner—Stanley H. Tollberg
Attorney, Agent, or Firm—Blanchard, Flynn, Thiel, Boutell & Tanis

[57] ABSTRACT

An apparatus for metering liquids into ungraduated dosage vessels. The dosage vessel has bottom and side walls defining an upper mouth, at least a portion of one side wall being substantially vertical, transparent and arranged for coaction with a graduated scale, placed outside said portion. The scale is separated from the outside of the vessel portion by an air gap, whereby light rays from the scale graduations pass through the interface at the inner surface of the vessel wall when it is empty, so that the graduations are visible from the mouth of the vessel, whereas said rays are totally internally reflected when the vessel is filled with liquid above the graduation mark in question, since the liquid has a greater refraction index than air, the graduation mark thus being no longer visible from the mouth of the vessel. Metering is facilitated by the possibility of reading off the volume graduation scale from above while the liquid is being poured into the vessel and the apparatus is supported by a horizontal substructure such as a table. Metering can be executed for a large number of ungraduated dosage vessels using one and the same graduated scale. The apparatus is particularly suitable for doses of medicine.

8 Claims, 1 Drawing Figure

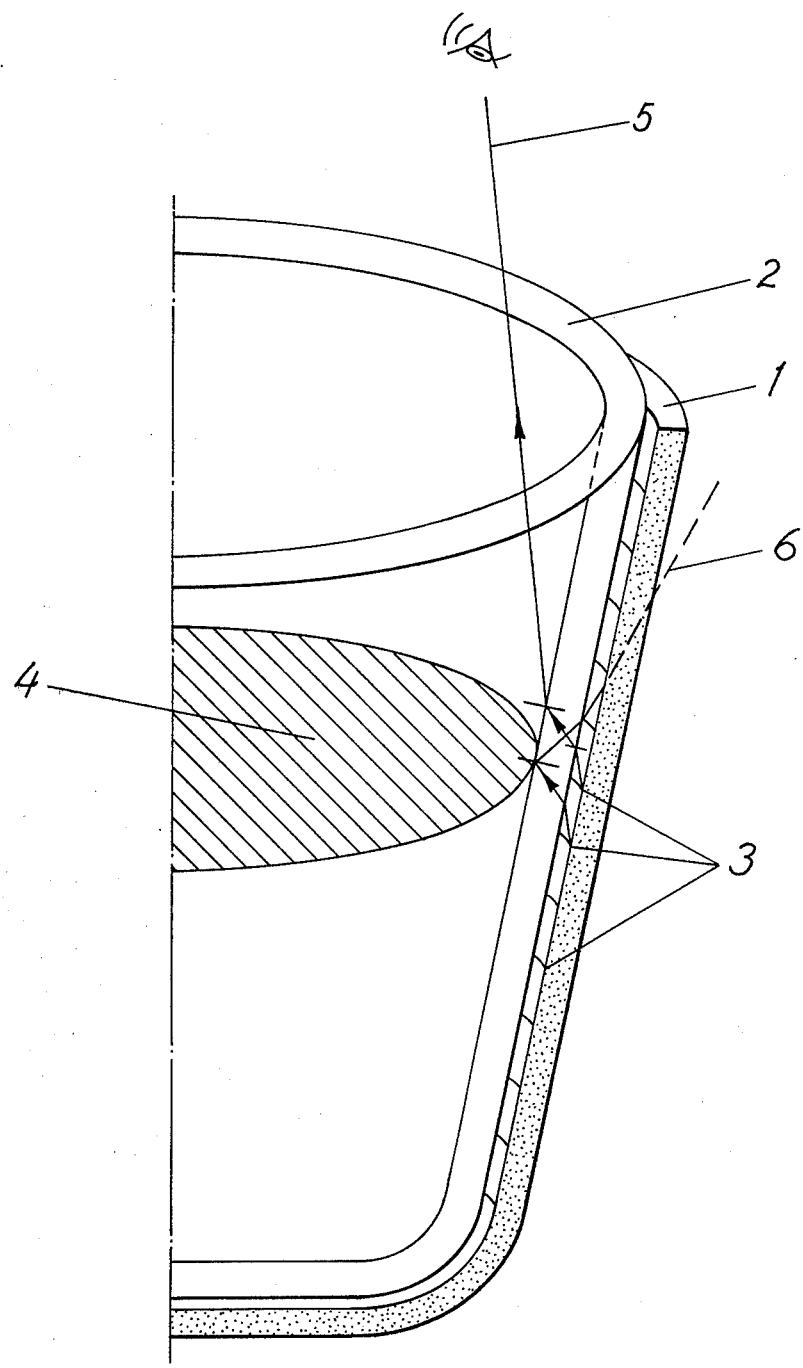

APPARATUS FOR METERING OR DISTRIBUTING THE VOLUME OF LIQUIDS

The present invention relates to an apparatus for metering or distributing of liquids. The apparatus according to the invention comprises an inner vessel for accomodating the liquid, the volume of which is to be metered, and an outer vessel surrounding the inner vessel and provided with a volume graduation scale. The invention is based on the principle that the volume graduation scale is mounted outside the inner vessel, total internal reflection occuring when liquid is poured into the inner vessel, owing to that the ray of light from a graduation mark being covered by the liquid, by refraction in media with different optical densities is subject to total internal reflection so that it appears to the eye that the volume graduation scale disappears from below as liquid is poured into the vessel. Metering is also facilitated in that during metering it is possible to read the volume graduation scale from above while the apparatus is standing upright, e.g. on a table.

The apparatus according to the invention can be utilized in all areas where it is required to meter small or medium large liquid volumes, e.g. it can be utilized for medicine dosages.

The object of the invention is to achieve an apparatus for metering of liquids into an ungraduated dosage vessel having bottom and side walls defining an upper mouth. At least a portion of one side wall of the vessel is substantially vertical, transparent and arranged for coaction with a graduated scale, placed outside said portion. The scale is separated from the outside of the vessel portion by an air gap, whereby light rays from the scale graduations pass through the interface at the inner surface of the vessel wall when it is empty, so that the graduations are visible from the mouth of the vessel, whereas said rays are totally internally reflected at the interface between the inner surface of the vessel wall and the liquid when the vessel is filled with liquid above the graduation mark in question, since the liquid has a greater refraction index than air, the graduation mark thus being no longer visible from the mouth of the vessel.

Another object of the invention is to achieve an apparatus for metering by arranging the scale on an outer vessel surrounding the dosage vessel, whereat in one embodiment both said vessels, have tapered side walls.

In a further embodiment of the invention the graduations are arranged on the inner surface of the outer vessel side wall or the scale may be arranged on the outer surface of the outer vessel side wall if said wall is transparent.

The invention will now be described in detail while referring to the attached drawing, which shows the apparatus according to the present invention in a schematic perspective view with partially broken-away portions.

The apparatus according to the invention comprises an outer vessel 1 surrounding an inner vessel 2 with a small gap or slot between them, the liquid to be volumetrically metered being poured into the inner vessel 2. A graduation scale 3 is arranged on the interior side wall of the outer vessel 1. The reference numeral 4 denotes the level of the liquid in the inner vessel 2. If the liquid level 4 is observed from above in the way indicated in the figure, a boundary ray of light 5 at the interface between the liquid level 4 and the interior side wall of the inner vessel 2 will be refracted substantially in the way denoted in the figure from the graduation scale 3.

A ray of light inside this boundary ray of light, e.g. the ray denoted by the numeral 6 in the figure, will on the other hand be totally internally reflected. The light ray 6 from a mark of the section of the graduation scale situated under the mark represented by the ray 5 will by total internal reflection "disappear" and will not be visible to the eye. For these more "central" rays 6 the light thus goes from a graduation mark of the volume graduation scale being arranged outside the inner vessel and with a gap between them, through media of different optical densities in such a way that the ray will be totally internally reflected. Thus the portion of the graduation scale 3 lying under the liquid level will not be visible, which facilitates the metering as it is possible to read the graduation scale from above. The invention thereby eliminates the need of lifting up the vessel to eye level in order to read off the the graduation scale, as with ordinary simple measuring vessels provided with a graduation scale.

In the embodiment of the invention described above the inner vessel 2 is transparent, or has at least a transparent vertical portion through which the graduation scale 3 can be observed. In this embodiment the outer vessel 1 is not transparent or is opaque and the graduation scale is on the inside surface of the vessel.

Instead of a complete outer vessel a stand or rack can be used, adapted to the inner vessel and having a scale interacting with the vertical transparent part of the metering vessel. However, it is also possible to utlize a transparent outer vessel 1. In the latter case, the graduation scale can then be placed on the outer surface of the outer vessel, although this is not necessary. In the arrangement shown in the FIGURE, the air space between the outer and inner vessels has been exaggerated for the sake of clarity.

Within the scope of the basic idea of the invention, an outer vessel 1 may, for example, be used as a base unit together with a large number of individual inner vessels 2, which are in turn placed in the outer vessel for filling or metering with a controlled volume.

One skilled in the art will appreciate that the embodiment of the invention described above can be modified and varied in many ways within the scope of the basic idea for the invention.

I claim:

1. An apparatus for metering liquids comprising:
   an ungraduated dosage vessel for receiving the liquid and having bottom and side walls defining an upward opening mouth, at least one upwardly extending portion of a said side wall being transparent; and
   means carrying a graduated scale arranged for coaction with said upwardly extending transparent portion of the dosage vessel, said graduated scale carrying means being placed outside said portion, said scale facing the dosage vessel and being separated from the outside of the dosage vessel portion by an air gap, light rays from the scale graduations extending through the interface at the inner surface of the vessel when the vessel is empty, so that the graduations are visible from above through the mouth of the vessel, light rays from the scale graduations being totally internally reflected at the interface between the inner surface of the vessel wall and a liquid in the vessel, with the liquid having greater refraction index than air, the scale graduation thus being no longer visible from above through the mouth of the vessel.

2. Apparatus as claimed in claim 1, wherein the means carrying the graduated scale used in measuring the liquid level in the dosage vessel is a separate outer vessel receiving the ungraduated inner dosage vessel.

3. Apparatus as claimed in claim 2, wherein the dosage vessel and the outer vessel both are formed with tapered side walls.

4. Apparatus as claimed in claim 2 or 3, wherein the graduations, for measuring the liquid level in the inner dosage vessel, are applied on the inner surface of the outer vessel side wall.

5. Apparatus as claimed in claim 2 or 3, wherein the outer vessel is transparent and the graduated scale, for measuring the liquid level in the inner dosage vessel, is applied on the outer surface of the outer vessel side wall.

6. An apparatus for visually metering from above, even during filling, the liquid level in an ungraduated vessel, comprising:
an ungraduated dosage vessel for receiving the liquid and having a bottom wall and side walls defining an upward opening mouth, at least one upwardly extending portion of a said side wall being transparent; and
means defining a stand including a generally upwardly extending graduated scale having a plurality of graduations and means for locating said dosage vessel with its said transparent side wall portion in close spaced opposition to said graduated scale on said stand, said graduated scale facing toward said transparent portion of said dosage vessel, said scale facing said dosage vessel portion across an air gap, said transparent vessel portion and said scale extending upward in substantially parallel relation such that the thickness of said air gap is substantially constant, said air gap being small and determined by close placement of said dosage vessel in a removable manner next to said scale,
each graduation being located on said scale somewhat below the actual level of liquid in the dosage vessel which it is to measure, said air gap and transparent side wall portion of said dosage vessel providing a refractive light path from a graduation on said scale through said air gap and transparent side wall portion and out the open upper end of the vessel such that an observer looking down into the mouth of the dosage vessel will see that the liquid level is below the level denoted by said graduation, said air gap and transparent side wall portion providing a reflective light path from a further graduation on said scale through said air gap and transparent side wall portion to the inside surface of the latter at a point thereon and then back through said transparent side wall portion away from the interior of said vessel, in response to presence of liquid in the dosage vessel above the level of said point, such than an observer looking down into the mouth of said vessel will not see said further graduation and will thus be aware that the liquid level in the dosage vessel is above the level denoted by said further graduation.

7. The apparatus of claim 6 in which said stand is an outer vessel in which said dosage vessel is snugly receivable, said outer vessel having a side wall carrying said scale, said scale being visible from within said outer vessel, said inner and outer vessels tapering downwardly to facilitate insertion and removal of said inner vessel and said outer vessel, so as to permit sequential insertion of a series of said ungraduated dosage vessels into said outer vessel for metering the level of liquids in said dosage vessels.

8. A method for visually metering, from above, even during filling, the liquid level in an ungraduated vessel, comprising:
providing an outer vessel having a bottom, side walls and an upwardly opening mouth and an upwardly extending graduated scale having a plurality of graduations on one side wall of said outer vessel and visible from inside said outer vessel;
inserting in snugly received relation into said outer vessel an ungraduated inner dosage vessel having a bottom wall, side walls and an upwardly opening mouth, with a generally upstanding transparent side wall portion of said inner dosage vessel facing directly toward said graduated scale on said outer vessel;
providing liquid in said inner vessel, the quantity of which is to be measured visually;
locating the vessel in an illuminated area and thereby causing light rays from graduations denoting liquid levels below the actual level of liquid in the inner vessel to pass through the air gap between the vessels, through the transparent side wall portion of the inner vessel to the inside surface thereof at a point below the liquid level and reflect back through said inner vessel wall and away from the interior of said inner vessel such that such light rays are not visible to an observer looking downward into the mouth of the inner vessel;
observing by looking downward through the mouth of the inner vessel light rays from graduations denoting liquid levels above the actual liquid level in the vessel, which light rays pass from such graduations through the air gap between the vessels, through the side wall of the inner vessel and are refracted upward through the mouth of the vessel toward the observer;
whereby to measure by observation of light rays from graduations the level of liquid in an ungraduated vessel by looking downward into the interior of such vessel through the mouth thereof.

* * * * *